May 20, 1941.  A. M. WAHL  2,242,379
TORQUE LIMITING DEVICE
Filed Jan. 10, 1940

WITNESSES:
R. J. Fitzgerald
Wm. J. Ruano

INVENTOR
Arthur M. Wahl.
BY
Paul E. Friedemann
ATTORNEY

Patented May 20, 1941

2,242,379

UNITED STATES PATENT OFFICE 2,242,379

TORQUE LIMITING DEVICE

Arthur M. Wahl, Wilkinsburg, Pa., assignor to Westinghouse Electric & Manufacturing Company, East Pittsburgh, Pa., a corporation of Pennsylvania Application January 10, 1940, Serial No. 313,240

4 Claims. (Cl. 64—30)

My invention relates to a mechanical clutch or torque limiting device, and is more specifically directed to the use of a spring means limiting the transmitted torque to a predetermined value.

An object of my invention is to provide a torque limiting device which will more accurately limit transmitted torques to a predetermined maximum value than similar devices used in the art.

Another object of my invention is to provide a mechanical slip clutch which is exceedingly simple in character and which embodies a torque limiting feature; that is, allows transmission of torque only up to a very definite maximum value, thereafter slipping, which value is independent of the coefficient of friction of the interengaging parts.

Another object of my invention is to provide a torque limiting device which will accurately limit the torque transmitted irrespective of the direction of rotation of a reversible drive shaft.

Other objects and advantages will become more apparent from a study of the following specification when considered in conjunction with the accompanying drawing, in which.

In the past, slip clutches and torque limiting devices of various kinds, have been used for the purpose of limiting peaked torques which may arise in certain mechanisms in order to avoid excessive stresses which may cause fatigue, fractures, or bearing failure, or even fractures resulting in a single load application. One well known way of doing this has been to use shear pins which shear off when the torque exceeds a certain value. Such device has a disadvantage that considerable variation may occur in the maximum torque necessary to shear the pin due to variations in the strength of the material, etc., and has the further disadvantage that the mechanism is inoperative after shearing of the pin has occurred and until a new pin is put in its place. Friction clutches of the slip type have also been used which will slip when the torque exceeds a certain value. Such devices have had the outstanding disadvantage that considerable variations in the coefficient of friction occur; hence there is considerable variation in the torque required to cause slippage.

Figure 1:
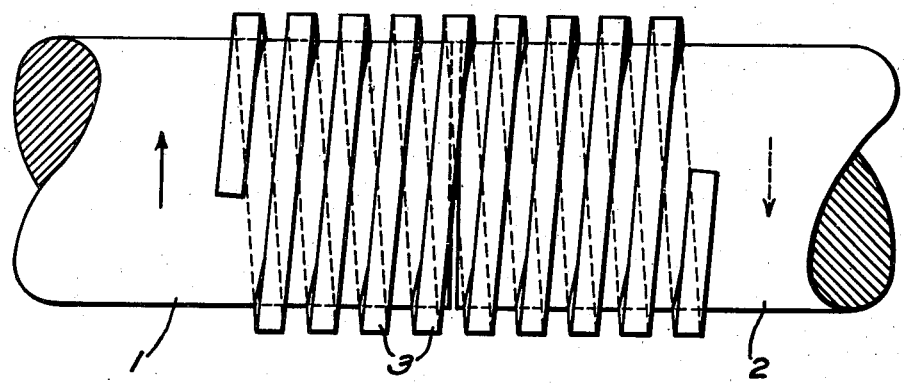
Figure 1 is a side view, partly in cross-section of a torque limiting device embodying the principles of my invention.

In accordance with my invention, I provide a slip clutch or torque limiting device which is entirely independent of variations in the coefficient of friction. Referring more particularly to Fig. 1, numeral 1 denotes a driving shaft and numeral 2 denotes a driven shaft, and numeral 3 denotes a helical spring having end portions which are tightly wrapped about the end portions of the driving and driven shafts, respectively. The spring 3 may be of any suitable cross-section, such as round, square, rectangular, or other shapes. The original inside diameter of the spring is slightly smaller than the shaft diameters.

I have found that the torque required to cause slippage of one shaft with respect to the other in a direction to unwind the spring is practically constant and independent of the coefficient of friction. This torque depends only on the spring dimensions, that is, the difference between the inside spring diameter and the shaft diameter, and on the spring material, provided there is a number of turns. In the direction tending to wind the spring, however, the slipping torque is very much higher and tends to vary with the coefficient of friction. In fact, the springs may grip the shafts more and more until eventually a rigid coupling is provided.

Hence, it will be seen that the device shown in Fig. 1 can be used as a clutch with spring 3 so wound with reference to the direction of rotation of the shaft 1 as to effect a binding or wrapping about the driven shaft 2, which winding or wrapping effect increases as the torque increases only up to a predetermined maximum value of torque, after which there will be slippage between either or both of the shafts and the spring.

In the direction of wind, however, the limiting torque is dependent upon the coefficient of friction; hence, its value is not very definite and may vary over too great a range for many drives requiring accuracy in the limiting of the torque to a maximum value.

On the other hand, if either the driving shaft 1 is driven in the opposite direction, or if spring 3 is wound in an opposite direction, or, in any event, if the rotation of the drive shaft 1 tends to unwrap the spring and the normal direction of drive is in such direction of unwrapping, then a very definite limiting value of torque is inherent in the structure. In other words, the clutch will transmit a certain amount of torque even though the tendency of the spring is to unwrap, and the stronger the spring, of course, the greater the transmitted torque. However, when the torque increases to a predetermined maximum value, the unwrapping action becomes so great as to effect slippage; hence, limiting the torque to a predetermined maximum value. In the figure, it will be apparent that spring 3 may, if desired, be rigidly secured at one end to driving shaft 1.

Figure 2:
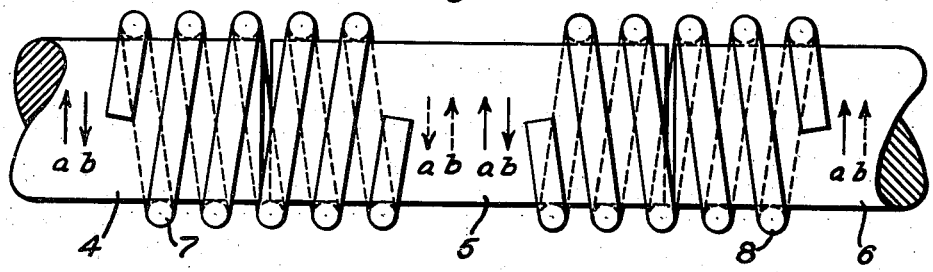
Fig. 2 is a side view of a device similar to Fig. 1, except that it is adapted for torque limiting irrespective of the direction of rotation of the drive shaft.

In the device shown in Fig. 2, numeral 4 denotes a reversible driving shaft, numeral 5 denotes an intermediate shaft, and numeral 6 denotes a driven shaft. Two helical springs 7 and 8 are provided, one which tightly wraps about an end portion of the driving shaft 4 and the left end of intermediate shaft 5, and the other which tightly wraps about the right-hand end of the intermediate shaft 5 and an end portion of driven shaft 6. Springs 7 and 8 are similar to spring 3 in that they are of smaller inner diameter than the diameter of the respective shafts about which they closely fit. Springs 7 and 8, however, are oppositely wound; that is, for example, spring 7 may be a right-hand wound spring, whereas spring 8 is a left-hand wound spring. Thus, it will be obvious that if the direction of rotation of driving shaft 4 is such as to cause an unwinding effect of spring 7, it will at the same time tend to cause a winding effect of spring 8 on shafts 5 and 6. Furthermore, if the direction of rotation of driving shaft 4 is reversed, spring 7 will effect a winding action on shafts 4 and 5, whereas spring 8 will effect an unwinding action on shafts 5 and 6. In either event, it will be seen that the maximum torque transmitted is limited to that of the unwinding action of the respective springs, since the springs tend to slip sooner in the unwind direction than in the wind direction as the result of increase of torque.

Thus, a device is provided which will have a definite maximum value of torque which may be transmitted, which value will be constant and independent of the coefficient of friction; hence which will be extremely reliable in cases where a very definite maximum limit of torque is desirable.

While helical springs have been shown, it will be apparent that other shapes—for example, helical spirals, etc.—may likewise be used within the sphere of my invention.

Figure 3:
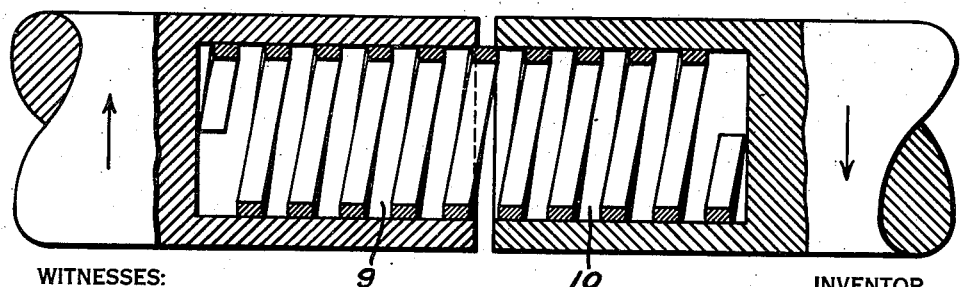
Fig. 3 is a side view, partly in cross-section, of a modification of the clutch shown in Figs. 1 and 2.

Furthermore, while the springs in Figs. 1 and 2 have been shown as being wrapped around the shafts, they may also be inserted in hollow end portions 9—10 of the shafts and expand outwardly instead of inwardly (as shown in Fig. 3). In such cases, the outer diameter of the spring must be slightly larger than the inner diameter of the hollow portion of the shaft. The same principle may be extended to the double clutch, reversely spring wound device such as shown in Fig. 2.

I am, of course, aware that others, particularly after having had the benefit of the teachings of my invention, may device other devices embodying the principles of my invention, and I, therefore, do not wish to be limited to the specific showings made in the drawing and the descriptive disclosure hereinbefore made, but wish to be limited only by the scope of the appended claims and such prior art that may be pertinent.

I claim as my invention:

1. A torque limiting mechanical clutch comprising a reversible driving shaft, an intermediate shaft, a spring closely fitted about the end portions of said shafts, a driven shaft, a second spring closely fitted about the other end of said intermediate shaft and said driven shaft, said springs being wound in opposite directions from each other.

2. A torque limiting mechanical clutch comprising a reversible driving shaft, an intermediate shaft and a driven shaft, all of substantially the same diameter and coaxially disposed, a pair of helical springs having inner diameters which are smaller than the shaft diameters, one of said springs being closely fitted around an end portion of said driving shaft and an end portion of said driven shaft and the other of said springs having an end portion closely fitted around the other end of said intermediate shaft and around an end portion of said driven member, said springs being reversely wound with respect to each other.

3. A torque limiting mechanical clutch comprising a reversible driving shaft, intermediate shaft means and a driven shaft, a pair of coil springs, one of which has an end portion which is tightly wrapped about a portion of the driving shaft and the other end portion which is tightly wrapped about a portion of said intermediate shaft means, the second coil spring having one end portion which is tightly wrapped about another portion of said intermediate shaft means, and the other end portion tightly wrapped about a portion of said driven shaft, said springs being reversely wound with respect to each other for affording torque limiting action in the unwinding direction of the springs, alternately, as the result of reversal of the direction of drive of said reversible driving shaft.

4. A torque limiting mechanical clutch comprising a reversible driving shaft, intermediate shaft means and a driven shaft, a pair of coil springs, one of which has an end portion which is tightly wrapped about a portion of the driving shaft and the other end portion which is tightly wrapped about a portion of said intermediate shaft means, the second coil spring having one end portion which is tightly wrapped about another portion of said intermediate shaft means, and the other end portion tightly wrapped about a portion of said driven shaft, said springs being reversely wound with respect to each other for affording torque limiting action in the unwinding direction of the springs, alternately, as the result of reversal of the direction of drive of said reversible driving shaft, each of said springs being helical and having inside diameters which are smaller than the outside diameters of the encircled shafts and shaft means.

ARTHUR M. WAHL.